United States Patent
DorEl

(10) Patent No.: US 7,913,288 B2
(45) Date of Patent: Mar. 22, 2011

(54) HOME ENTERTAINMENT SYSTEM

(75) Inventor: Allen (Avraham) DorEl, San Gabriel, CA (US)

(73) Assignee: Digital Interactive Systems Corp., Irvine, CA (US)

( * ) Notice: Subject to any disclaimer, the term of this patent is extended or adjusted under 35 U.S.C. 154(b) by 1334 days.

(21) Appl. No.: 10/752,737

(22) Filed: Jan. 6, 2004

(65) Prior Publication Data

US 2005/0149986 A1   Jul. 7, 2005

(51) Int. Cl.
*H04N 7/16* (2006.01)

(52) U.S. Cl. ............. 725/145; 725/115; 710/10; 710/74
(58) Field of Classification Search .................. 725/115, 725/145; 710/10, 74
See application file for complete search history.

(56) References Cited

U.S. PATENT DOCUMENTS

| | | | |
|---|---|---|---|
| 5,711,672 A | | 1/1998 | Redford et al. |
| 5,721,951 A | * | 2/1998 | DorEl .............................. 710/10 |
| 5,901,328 A | * | 5/1999 | Ooe ................................... 710/5 |
| 2003/0055657 A1 | * | 3/2003 | Yoshida et al. ................ 704/500 |

* cited by examiner

*Primary Examiner* — Hunter B. Lonsberry
*Assistant Examiner* — Nnenna Ekpo
(74) *Attorney, Agent, or Firm* — Hani Z. Sayed; Rutan & Tucker, LLP

(57) ABSTRACT

A dedicated apparatus for playing unmodified software, housed in a home entertainment system chassis, for playing in a home entertainment environment the existing body of interactive multimedia software that has been formatted and published for compatibility with standard personal computer platforms. Video and audio output signals are generated in response to the processing of the multimedia software program, which are fed to the home entertainment system for presentation to an audience. A further aspect is the provision of a drop & play feature which automatically initiates playing of multimedia software in a sequence that appears to be similar to playing on a videogame console, i.e., without requiring any further action from a user after inserting the media or selecting play. This feature is in part provided by a table containing installation information for each of numerous multimedia software titles; entries in this table are preferably indexed by an identifier that can be uniquely derived from a given CD-ROM/DVD or other portable media. The multimedia software may alternatively be provided via a network, such as the Internet.

41 Claims, 14 Drawing Sheets

1

HOME ENTERTAINMENT SYSTEM

FIELD OF THE INVENTION

The present invention relates generally to interactive multimedia systems. The present invention relates more particularly to an apparatus for playing interactive multimedia software programs, such as those stored on CD-ROM/DVDs or downloaded from the Internet, on a television display with a minimum of user interaction to install the interactive multimedia software programs.

BACKGROUND OF THE INVENTION

It is well known that an important trend in the personal computer and consumer electronics industries is explosive growth in the area of multimedia software programs, which are typically distributed on CD-ROM/DVD discs or via the Internet and which emphasize interactive audiovisual content. Games are one example of such multimedia software programs. A critical concern for hardware developers, software developers, and consumers is what platform will eventually emerge as the leading standard for viewing and interacting with such multimedia software.

Today, one dominant platform appears to be the desktop multimedia personal computer, which is typically an IBM compatible, Windows® based multimedia computer system. This may be true because of the large installed base. A large number of these systems have already infiltrated homes and businesses for other purposes. An overwhelming majority of multimedia software titles are therefore published for this platform, and can only be played on compatible systems.

As a result of this trend, consumers increasingly demand that the personal computer function as an entertainment system apparatus for playing and interacting with audiovisual compact discs, instead of merely as a machine for managing documents and performing desk work.

However, because of its traditional role as a machine for performing tasks like document editing and spreadsheet calculation, the personal computer has generally been physically designed for desktop work, not for entertainment. Thus, both the hardware chassis or case, as well as the user interface (e.g., mouse, keyboard, and VGA monitor), are generally built and integrated in a manner well-suited to a user sitting upright in an office chair working at a desk and staring at screens of documentary information at close range.

By way of contrast, the hardware chassis and the user interface are not similar to those which commonly form home entertainment system components. That is, the hardware chassis of a personal computer is not configured so as to resemble a home entertainment component such as a VCR or DVD player. Rather, the hardware chassis tends to be larger and less aesthetically appealing. Similarly, the keyboard of a personal computer tends to be larger and more cumbersome than a typical game controller for a contemporary dedicated game console.

The same is more or less true even for newer, portable laptop computers, which are not really comfortable for laps, but which are rather suited for smaller desktop settings such as an airline seat and tray table.

Preferably, consumers should be able to view and interact with multimedia software in the same relaxed comfort and manner in which they enjoy television, videos, and music, e.g., relaxing on a comfortable couch in the living room and watching images on a large screen television placed at a comfortable distance. Instead, because of the conventional, prior art architecture and design of personal computers, consumers must generally experience their multimedia titles in home office environments better suited for document work than for audiovisual entertainment.

Responding to this problem, a number of consumer electronics companies have recently begun selling proprietary multimedia consoles or game players, such as Nintindo's Game Cube, Microsoft's XBox and Sony's Play Station.

However, although these platforms are designed to provide consumers with a more satisfactory entertainment viewing experience than the traditional desktop computer, they have generally been conceived and implemented special-purpose game machines, and have not been electronically designed for compatibility with existing multimedia CD-ROM/DVD or Internet available titles published for the desktop PC platform.

Another response has been to take an existing, desktop or laptop personal computer and augment it with bridging technology such as converter cards that can receive video output in standard personal computer format and convert it to television-compatible format (e.g., NTSC video), whereupon the video output may be routed on to a television monitor. A company called Antec apparently offers such a product, called the TVator.

Although this ad-hoc approach does allow users to view personal computer multimedia software on a television set, it still suffers from important limitations. For example, the ad-hoc bridging approach is unwieldy and cumbersome, because the traditional desktop computer platform is not physically designed for the home entertainment environment, and the computer chassis and cables are not physically designed for easy integration with a television set and other home entertainment components.

Additionally, the video converter card does not address the user interface problem; namely, a typical personal computer keyboard and mouse are extremely inconvenient, if not totally unworkable, for a home user sitting on a comfortable couch and watching a large screen television several feet away. These drawbacks may be major deterrents for the home consumer.

A related problem and limitation of prior art players for interactive multimedia CD-ROM/DVD or Internet available titles is that the process of initiating the play of such titles is often cumbersome and confusing. Typically, in order to play an interactive multimedia CD-ROM/DVD disc using a conventional multimedia PC system, the user places the disc in a compact disc drive, and then commands the computer to install the title, which involves copying various files from the compact disc to the computer's hard disk drive, and setting the values of various system parameters. Alternatively, the game may be downloaded from a network, such as the Internet, and then installed.

It is known that commercially available titles often include interactive scripts and the like to facilitate this process somewhat. Nevertheless, the process of starting up an interactive CD-ROM/DVD or downloaded title remains less comfortable for consumers than the simple technique of pushing a play button on a remote control or on the control panel of a typical home entertainment appliance such as a television set or audio compact disc player.

In view of these limitations and drawbacks, an improved product for playing PC compatible interactive multimedia CD-ROM/DVDs or Internet available titles is greatly needed.

SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention provides advantageous methods and apparatus for playing the large body of interactive multimedia software programs that have been formatted and published for compatibility with standard personal computer platforms, such as those software programs available on the MPC CD-ROM/DVD platform and those software programs available on the Internet, for example.

The invention provides devices and methods for providing a player apparatus utilized to process and play multimedia software within the home entertainment environment. A processor capable of playing standard desktop computer multimedia software without alteration is housed in a home entertainment system chassis, such as those commonly used for game consoles, so as to provide convenience and aesthetic appeal.

Circuits are also provided for generating one or more video output signals and one or mere audio output signals in response to the processing of the multimedia software program, and for feeding those audio and video output signals to one or more presentation devices integrated within a home entertainment system, such as to a large screen television and to a stereo system. The signals are preferably converted to an appropriate format, such as a television signal format, for the desired presentation devices.

A further aspect of the invention includes devices and methods for responding to generic play commands from users by automatically initiating processing of multimedia software, including the performance of any requisite start-up or installation procedures, preferably without requiring any further interaction or input by the user, thereby providing drop & play functionality as is characteristic of the traditional home entertainment environment.

In part, this drop & play feature is provided by use of a look-up table or database containing installation information for each of numerous multimedia software titles. The installation information is preferably sufficient so as to facilitate full installation of the software. That is, the installation information preferably comprises installation instructions for the home entertainment system, so that the home entertainment system can autonomously install the software.

Entries in this table are preferably indexed by an identifier that can uniquely be derived from a given CD-ROM/DVD, other multimedia medium, or from the Internet provided software program. Alternatively, such installation information may be provided as an instruction set, such as a script, which is provided on the game media or otherwise is provided along with the game, such as in the title area of a CD-ROM/DVD.

Preferred features and embodiments of the present invention include providing a data communications link for receiving external data transmissions. In this way, and with the addition of various other devices and methods as disclosed herein, the invention preferably provides a convenient access point to the information superhighway. As described below, such access to the Internet facilitates the downloading of interactive multimedia software programs which may be played on the home entertainment system of the present invention.

Moreover, the invention further offers an attractive platform for advanced capabilities including interactive television services, video teleconferencing, and instant replay on demand of television transmissions, all preferably from a platform that is advantageously integrated within a traditional home entertainment center.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

DETAILED DESCRIPTION

Figure 1:
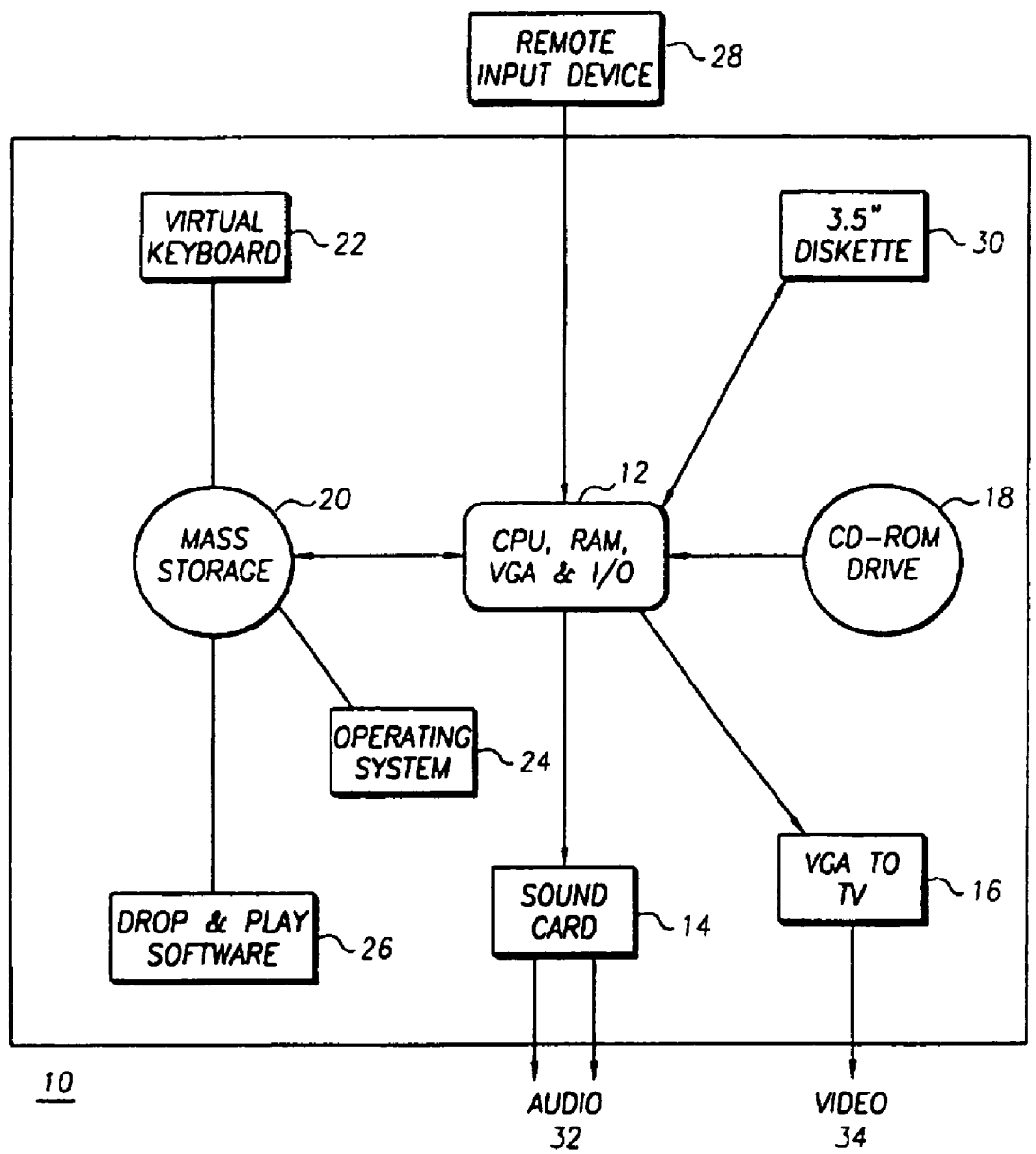
FIG. 1 illustrates the basic architecture of an interactive multimedia player for integration within a home entertainment system.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

A home entertainment system with some of the same features as the present invention is disclosed in U.S. Pat. No. 5,721,951, the entire contents of which are hereby incorporated by reference.

FIG. 1 illustrates the basic architecture of an interactive multimedia player in accordance with the present invention. The player is housed in player chassis 10. Unlike a conventional chassis for a prior art desktop computer or laptop computer, player chassis 10 is preferably a home entertainment system chassis, meaning its dimensions will fit atop a typical television set or otherwise fit smoothly into a typical home entertainment center the player chassis 10 is preferably styled in the general fashion of a typical home entertainment system component, such as a VCR, CD player, DVD player, set top box, or game console.

In other words, player chassis 10 is physically designed more or less like a VCR chassis, for convenient connection to a television set and for integration within a consumer home entertainment system.

As shown further in FIG. 1, chassis 10 houses hardware and software sufficient to support MPC-compatible interactive multimedia ("MPC" is a well-known personal computer standard defined by the Multimedia PC Marketing Council). Accordingly, processor 12 preferably includes a CPU of the 2 GHz Pentium class or higher. Preferably, at least 512 megabytes of internal RAM storage, at least 16 megabytes of video RAM storage, and standard I/O ports including ports for mouse input and for VGA video output are provided. Mass storage 20 preferably comprises a hard disk drive of at least 60 Gegabyte capacity. CD-ROM/DVD drive 18 preferably supports a sustained transfer rate of at least 300 kb/sec., with a maximum average seek time of 400 ms, is multi-session capable, and provides CD-DA output. Sound circuit or card 14 is preferably a 16 bit sound circuit or card. As those skilled in the art will appreciate, these are merely preferred minimum parameters and these parameters will change over time as technology permits. Thus, it will generally be desirable to use components which have state-of-the-art specifications, so as to facilitate playing of games which are as realistic as possible and which have other desired features, such as multi-player online capability.

Mass storage 20 stores various software for controlling the player system, including operating system 24 (preferably a Microsoft Windows® operating system, such as Windows XP or greater, including any multimedia drivers and extensions). The lookup table or database used to automate the installation process may also be stored on mass storage 20, or may alternatively be store elsewhere, such as on a remote server accessible via a network, such as the Internet.

The player of FIG. 1 also optionally includes auxiliary storage unit 30, such as a 3.5" diskette drive, for removable, archival storage, although this feature is not needed for MPC compatibility.

As shown further in FIG. 1, the capabilities of interactive multimedia player are enhanced by including within chassis 10 VGA-to-TV converter 16 (such as the ADS "TV Elite" card) for converting the VGA output signal of processor 12 into television signal 34, suitable for input to a television set (e.g., an NTSC or PAL signal, emitted as composite, S-VHS, component, digital, or RF signal format). Indeed, Thus, television signal 34 as well as audio output signals 32 may be connected via standard jacks or by any other suitable means to a desired television and audio amplifier/loudspeaker system, respectively.

Alternatively, video output may be provided to a projection television system, for display on a large screen, which may be particularly advantageous in the context of an institutional user needing an interactive multimedia player for purposes of an educational lecture, a product demonstration, or a similar group presentation. In that case, the projector itself may conveniently be integrated with chassis 10, for better portability and compactness.

It is important to appreciate that although the present invention is particularly well suit for use with games, it is not limited in application to games. The present invention may be used for various multimedia software programs, including both interactive and non-interactive multimedia software programs. Indeed, at least some of the features of the present invention have applications in non-multimedia software programs, as well. Thus, description of the present invention as being used for interactive multimedia games is by way of example only, and not by way of limitation.

The present player also features an appropriate user interface, so that the consumer may view and listen to his or her entertainment system (such as for playing games) from a comfortable distance and in a relaxed position, without having to balance a heavy keyboard on the user's lap. Conventional, corded keyboards and mouse devices are designed with flat-surfaced desktops in mind and are therefore not ideal for this context.

Instead, as indicated in FIG. 1, user input is preferably entered by means of remote input device 28, such as an infra-red mouse (e.g., Interlink Electronics' RemotePoint) or other hand-held, remote control device that provides cursor control-unlike standard television or VCR remote control devices-in order to support interactivity with MPC multimedia software. In addition, mass storage 20 preferably stores software 22 for implementing a virtual on-screen computer keyboard, whose keys are typed using the cursor device, when needed for a particular multimedia title.

Figure 2:
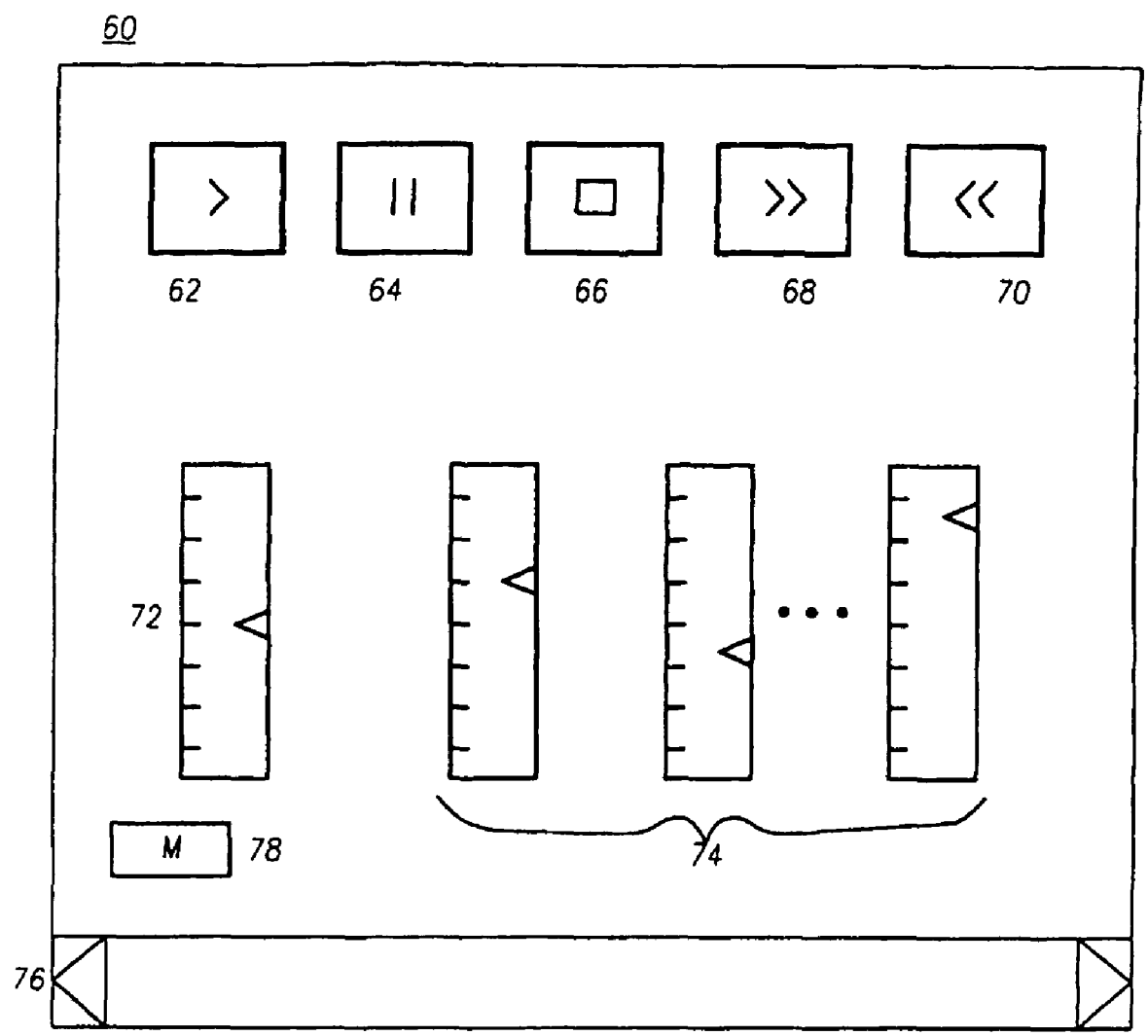
FIG. 2 illustrates a preferred embodiment of a virtual control panel for use with the present invention.

FIG. 2 illustrates a preferred embodiment of an on-screen virtual control panel that is preferably provided in addition to a standard computer keyboard. The control panel includes one-touch virtual buttons for various playback functions, as will be described further below.

An important feature of the present player enables users to play interactive multimedia titles in the same, simple "drop and play" manner as they are accustomed to playing non-interactive audio compact discs, video discs, cassettes, and the like.

Herein, we will refer to the user issuing a generic play command as meaning that initiating play of the current title requires only a generic, title-independent request by the user, such as the single-touch of a play button. By current title, we mean the title currently identified as the next title to be played, whether because the title currently resides in the system's CD drive, or because it is interactively selected by the user via menus or the like, or because it is identified by the system based on other criteria.

The key point is that even though many MPC-compatible titles normally require the user's involvement in initialization and/or installation procedures, ranging from protocols for starting-up execution (such as invoking a particular operating system or program name) to complex installation procedures in accordance with the present invention, such procedures (when needed) are performed automatically by the system without user involvement, preferably by drop & play software 26 as now described.

In a preferred embodiment of the invention, drop & play software 26 is implemented by means of an Installation Status Table database or IST. Each row of the IST stores installation information for a CD-ROM/DVD title recognized by the player.

Figure 3:
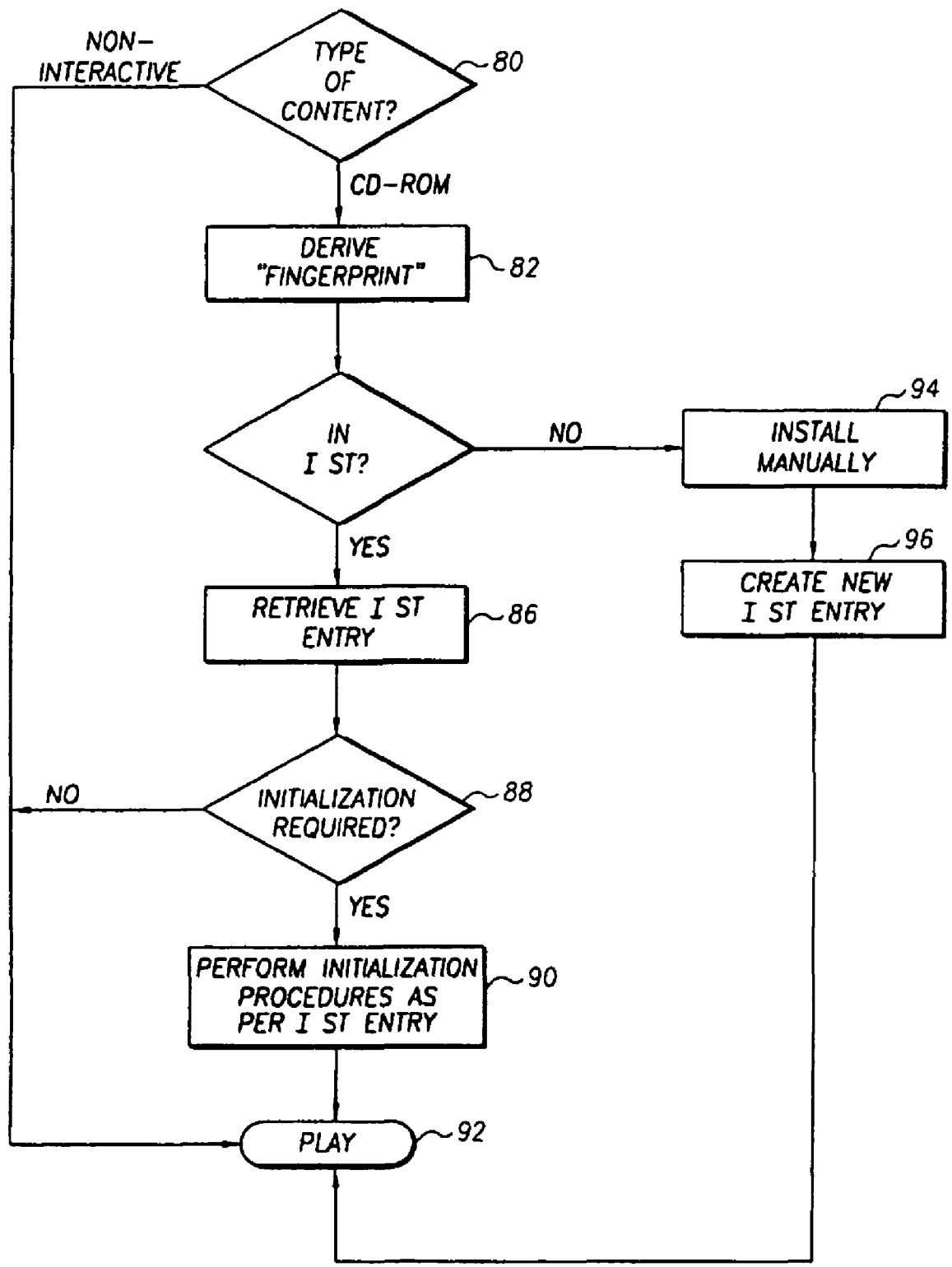
FIG. 3 is an illustrative flow chart of a basic method for providing drop & play functionality, in accordance with the present invention.
Figure 4:
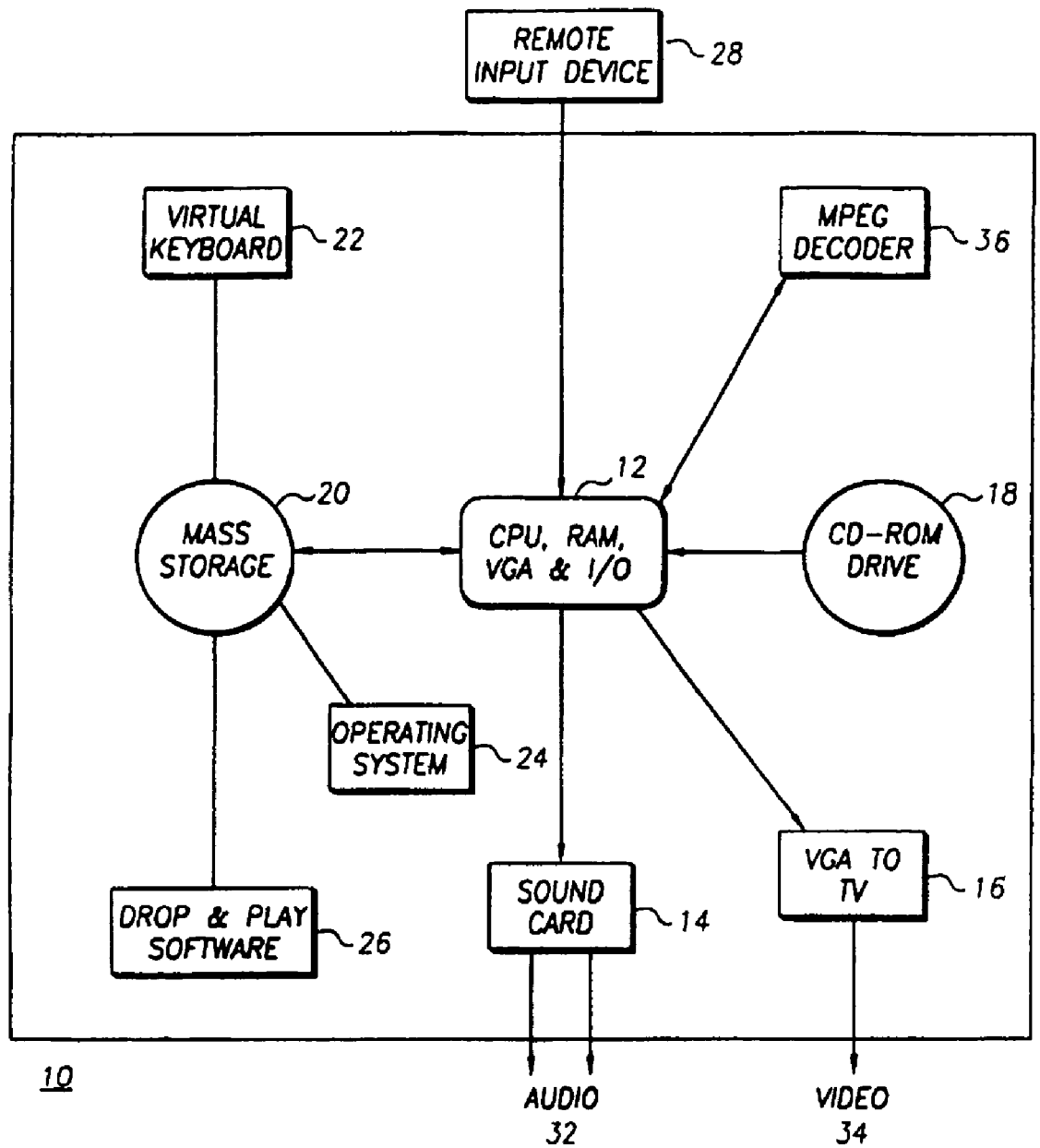
FIG. 4 illustrates a preferred embodiment of the present invention incorporating an MPEG video decoder.

FIG. 3 shows a flow chart of procedures to be performed by drop & play software 26, using an IST, to automate initialization and installation of the current CD-ROM/DVD interactive title after a user issues a play command. At block 80, a determination is made as to the general type or category of content in the current title to be played-e.g., whether the CD currently placed in CD-ROM/DVD drive 18 is an MPC interactive CD-ROM/DVD, a (non-interactive) video CD, a PhotoCD, or an audio CD, etc. If the CD is an MPC CD-ROM/DVD, then block 82 derives the identifier or fingerprint of the CD-ROM/DVD, preferably by computing a hash function derived from the file allocation table (FAT) of the CD-ROM/DVD disc, since all MPC-compatible CD-ROM/DVD discs contain a unique FAT. Any other technique for uniquely identifying and indexing CD-ROM/DVD titles may equivalently be used, as those of ordinary skill in the art will readily appreciate.

At block 84, a determination is made as to whether the identifier derived for the current CD-ROM/DVD disc matches a value stored in the IST. If so, then the player recognizes this particular CD-ROM/DVD title, and at block 86, the information stored in the IST for the matching entry is retrieved and examined further. At block 88, a determination is made as to whether the matching entry indicates that some initialization procedure is required for this title. If no such initialization is required, then the player immediately begins to play the title at block 92. If the matching entry in the IST indicates that some initialization is required, then at block 90 all initialization procedures specified by the matching entry are performed.

These procedures may include such tasks as, for example, executing a specified run protocol; copying files specified by the matching IST entry from the CD-ROM/DVD disc to mass storage unit 20 of the player, into directories as specified by the IST entry; or running an installation program and providing a script of specific or default responses in response to an installation program. Thereafter, the CD-ROM/DVD title begins to play, at block 92.

If the CD-ROM/DVD title is not stored in the IST, then at block 94 the user must manually install the title the first time the title is played, following the title's standard installation instructions. After this manual installation, drop & play software 26 of the present player preferably creates a new IST table entry for the title at block 96, including a description of relevant machine and file states affected by the installation procedure, so that the new title can thereafter be played using the fully automated drop and play procedure described above in blocks 82-92.

Non-interactive audio CD (or video CD) can also be played on the present player with a simple play command, just like on a conventional home entertainment compact disc audio system. If the player recognizes, at block 80, that the compact disc placed in CD-ROM/DVD drive 18 contains non-interactive material such as a conventional audio CD, then no installation is necessary, and the player can immediately begin playback of the disc. Moreover, the player preferably provides additional control over playback of non-interactive titles, by means of a virtual control panel such as the control panel illustrated in FIG. 2.

Referring now to the details of FIG. 2, the function of Play Button 62 has already been described. Pause Button 64, Stop Button 66, Fast Forward Button 68, Fast Backward Button 70, Volume Control 72, and Equalizing Sliders 74 are all available when playing audio CD or video CD, and are all self-explanatory for those of ordinary skill and familiarity with conventional, consumer audio/video appliances. Slide Bar 76 shows the current play position of the CD, preferably including a time scale for both audio CD and video CD discs, and a track scale for audio CD. Slide Bar 76 can also readily be used to advance the play position forward or backward along the scale displayed, in well-known scrolling manner.

The control panel of FIG. 2 also preferably includes Mode Button 78, allowing users to select among various play modes for audio CD and video CD. At least four modes are preferably available for audio CD, and two modes for video CD, as follows:

For audio CD the 4 modes are:
Playlist: user selects play order of tracks.
Shuffle: the order of play is random.

Once: the order of play proceeds from the first track on the disc to the last.

Loop: the order of play proceeds from the first track on the disc to the last, and then repeats continually.

For Video CD the 2 modes available are:

Once: the movie is played once, in order.

Loop: the movie is repeatedly played in order.

As those of ordinary skill in the art will recognize, the virtual control panel described may readily be modified as dictated by the aesthetic or functional needs of particular applications. For example, the control panel can easily be adapted for use with a multi-disc changer, as by altering the behavior of a Playlist mode to allow users to select a play order among all of the tracks stored on the multiple discs in the changer. Other control panel features could also be modified in similar fashion.

Thus, by means of the multimedia player of the present invention, and as illustrated above by way of example with FIGS. 1-3, the existing body of interactive multimedia titles written for desktop computer platforms may conveniently and comfortably be played in the preferred environment of a typical home audiovisual entertainment system.

Additional, enhanced embodiments of the invention can be advantageously created, as suggested and illustrated in FIGS. 4-10. For example, by including MPEG decoder 36 (such as the RealMagic decoder card by Sigma Designs) within the system as in FIG. 4, the interactive multimedia player can further be used to play full-length feature films stored as compressed MPEG data on CD-ROM/DVD discs, in a true home entertainment environment.

As will be illustrated in connection with FIGS. 5-7, the present player may also be advantageously enhanced by including a data communications link 38 for receiving external data transmissions. External data transmissions received may then be processed using the computer power of processor 12, and then displayed and viewed in the advantageous context of a home entertainment setting, as described earlier. In this way, the present player effectively turns the home entertainment center into a convenient access point to the information superhighway.

Figure 5:
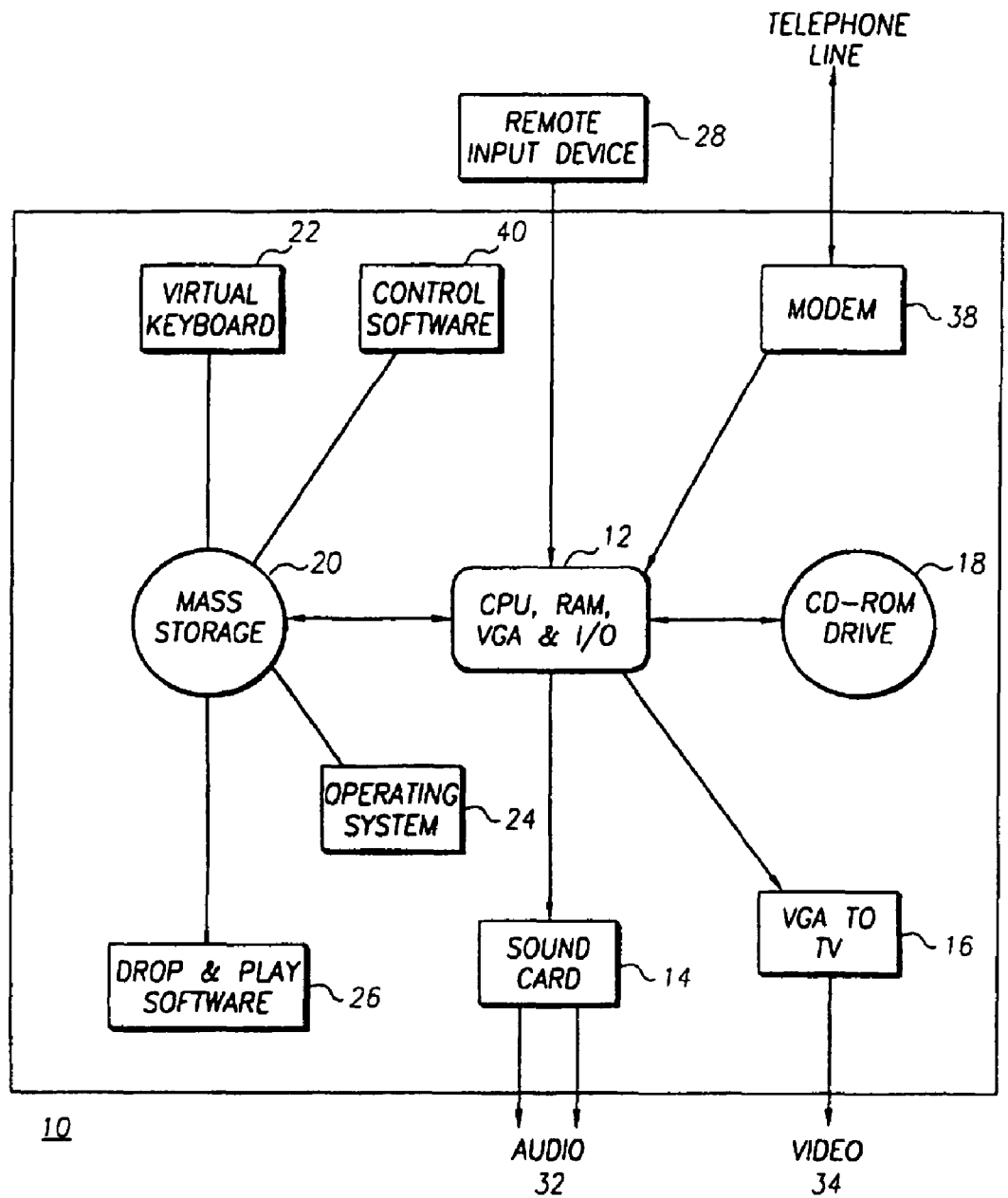
FIG. 5 illustrates a preferred embodiment of the present invention including a telecommunications link.

For example, in the embodiment of FIG. 5, the data communications link is provided by telecommunications link 38, e.g., a modem connected to a telephone line. The data communications link 38 according to any embodiment of the present invention may alternatively comprise DSL, a cable modem, a network interface card, a wireless data communications link, or any other type of data communications link. Thus, the data communications link 38 may be either wired or wireless.

In this way, the multimedia player of the present invention can conveniently be interconnected with wide area networks such as the Internet, Prodigy, Compuserve, America Online, etc., allowing the user to view and interact with audiovisual software products distributed through such wide area networks in the same manner as is presently done with personal computers, but with the advantage of utilizing a television and home entertainment system for viewing and interaction.

Software programs, such as games, can be downloaded via the data communications link 38. Control software 40, such as the commercially available, MPC-compatible products provided by vendors like America Online, control such interactions. Similarly, with straightforward control software, the player system of FIG. 5 can easily be used to support menu-driven, automatic dialing of telephone numbers in a user's personal directory, and other telephone and facsimile services, but in the advantageous context of a home entertainment system rather than a conventional, desktop personal computer.

Figure 6:
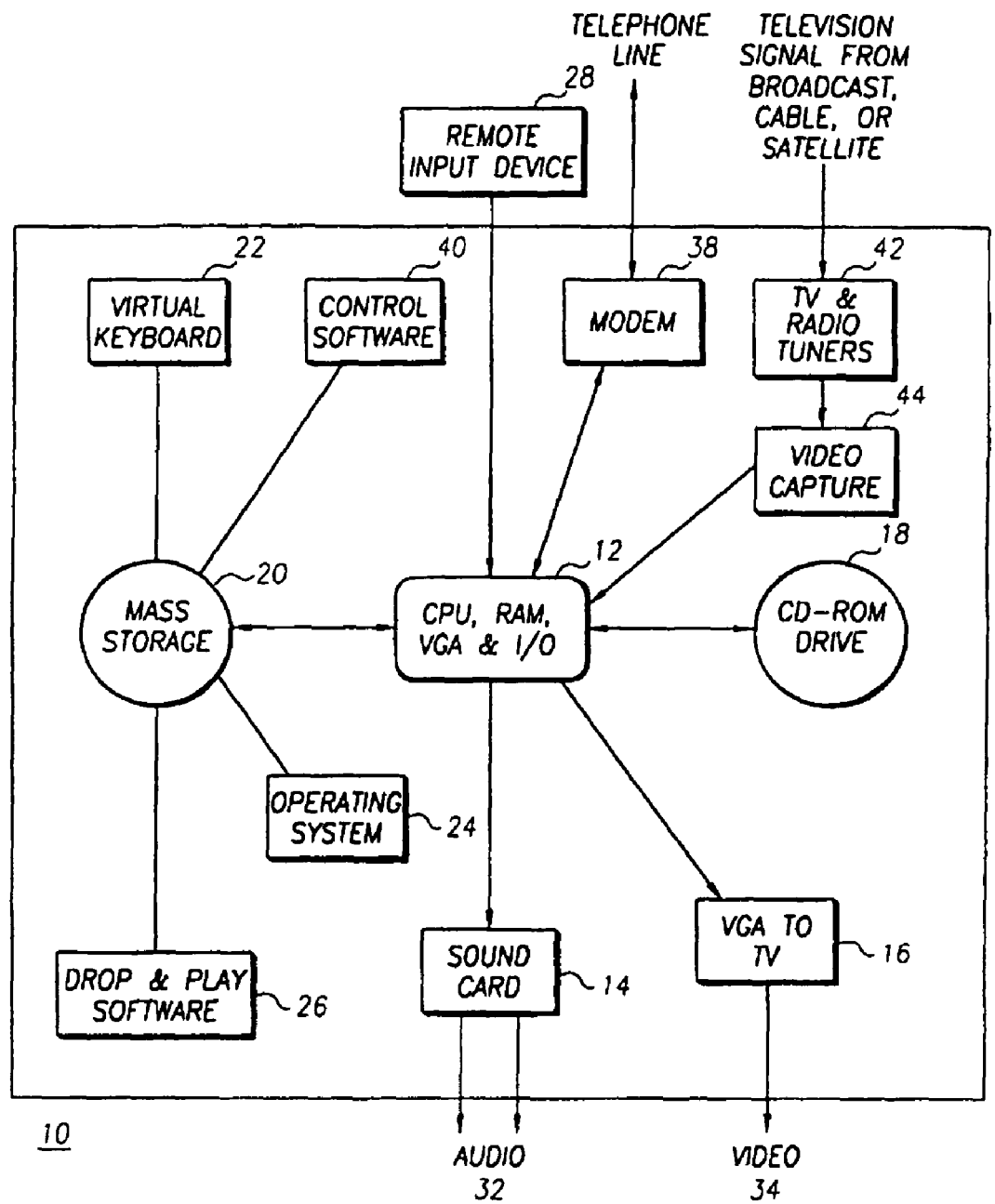
FIG. 6 illustrates a preferred embodiment of the present invention incorporating various means for providing multi-player games and other real-time interactive services.

Similarly, in the embodiment of FIG. 6, the data communications link is augmented with means for receiving television transmissions (e.g., broadcast, cable, or satellite signals) or radio transmissions by means of tuner 42. This embodiment preferably includes video capture board 44 for capturing any received television transmissions that are to be processed and presenting them to processor 12 in a suitable, digitized format. Telecommunications link 38 allows for transmission of data from the player to external recipients.

Again, by further including control software 40 (or, equivalently, logic circuitry) as appropriate to process the television or radio transmissions, the viewer may enjoy the benefits of interactive television from the attractive and appropriate environment of a home entertainment system.

As just one example further illustrating the system of FIG. 6, a company called Interactive Network, Inc. broadcasts an FM radio signal simultaneously with many sports contests, game shows, and other real-time events that contains questions and answers about the event in progress. Interactive Network subscribers typically receive these signals using special-purpose control unit receivers, which process the signals and permit users to, for example, make predictions about the next play to occur in a professional football contest; NTN Communications, Inc. has created a popular interactive football game, QB1, that has been used for this purpose.

The correct answer to each question is transmitted shortly thereafter, and the control unit can then grade the user's answer and maintain a running score, effectively allowing users to play along at home while simultaneously viewing sports or other real-time events on television. For more details, see U.S. Pat. No. 4,592,546, entitled "GAME OF SKILL PLAYABLE BY REMOTE PARTICIPANTS IN CONJUNCTION WITH A LIVE EVENT," dated Jun. 3, 1986, naming Anthony Fascenda and David Lockton as inventors.

Figure 7:
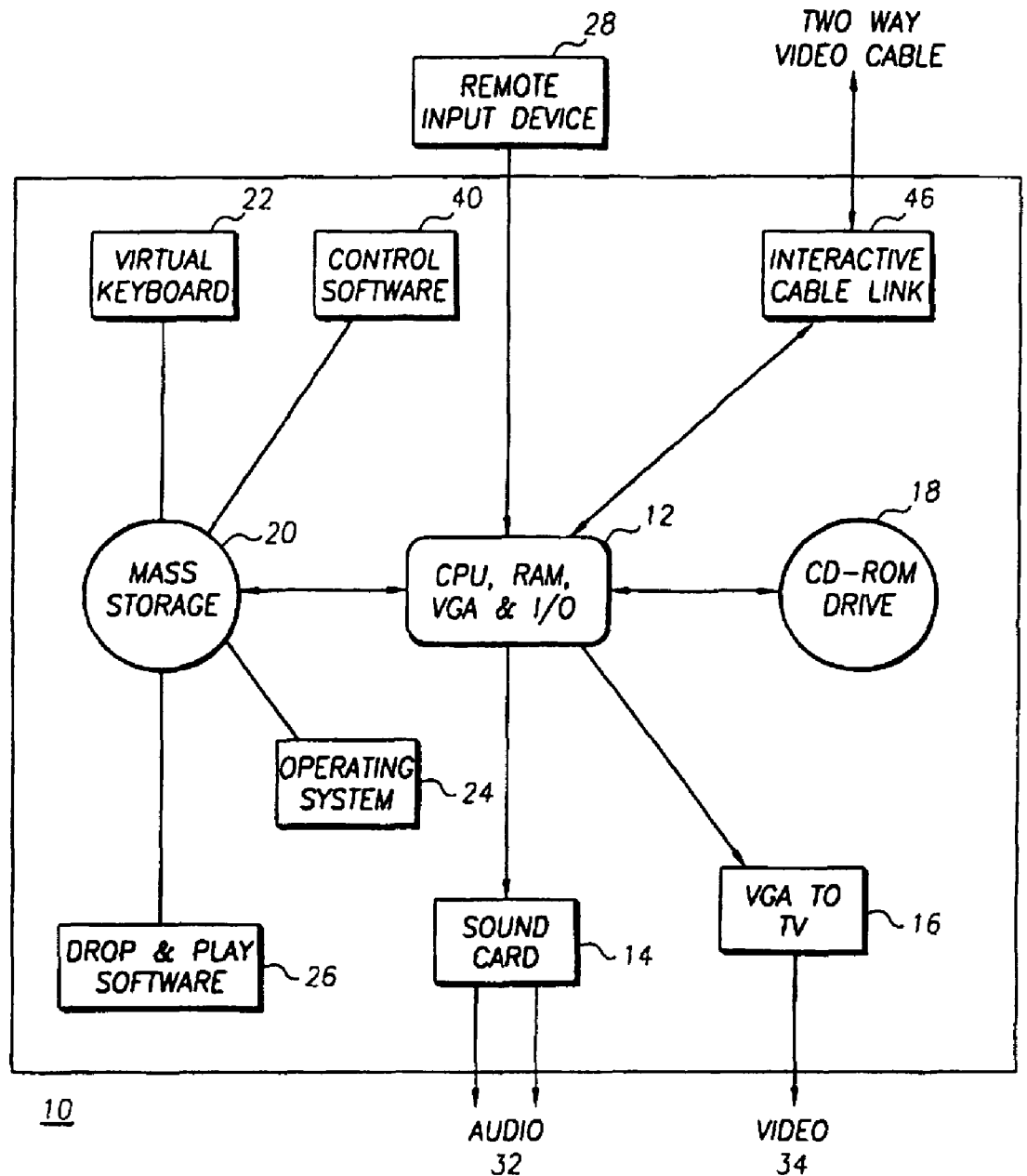
FIG. 7 illustrates an alternative preferred embodiment of the present invention for providing multi-player games and other real-time interactive services.

The interactive player of FIG. 7 allows users to enjoy the benefits of interactive broadcasts, such as those provided by Interactive Network, Inc., within the attractive and familiar environment of their existing television and home entertainment system, and without the need for a separate control unit or the like. In this example, control software 40 of the player would contain game playing application software akin to that already provided in Interactive Network control units for interpreting the FM signal, and for generating the screen displays and scores required by games.

FIG. 7 illustrates an alternative to the embodiment of FIG. 6 for providing interactive television functionality. In the example of FIG. 7, the data communications link takes the form of two-way interactive cable video link 46, such as provided NetGame's MUG (Multi User Game) technology. Either through this embodiment or through the embodiment of FIG. 6, users will be able to fully enjoy interactive television programming-such as videos on demand, multi-user real-time video games, etc.—as such programming becomes more widely available, because the player of the present invention provides the power of a complete, MPC-grade digital computer, integrated within a home entertainment system.

The player's computer power can be harnessed to render images, handle user interface processing, and perform other computations on each user's local player, in parallel, thereby greatly reducing communications traffic, reducing the required bandwidth, and increasing system efficiency, as those of skill in the art will readily appreciate.

In any event, the data communications link 38 may be used to download a game or other software program which then automatically installs itself with little or no user interaction and which is ready to play after this installation.

Figure 8A:
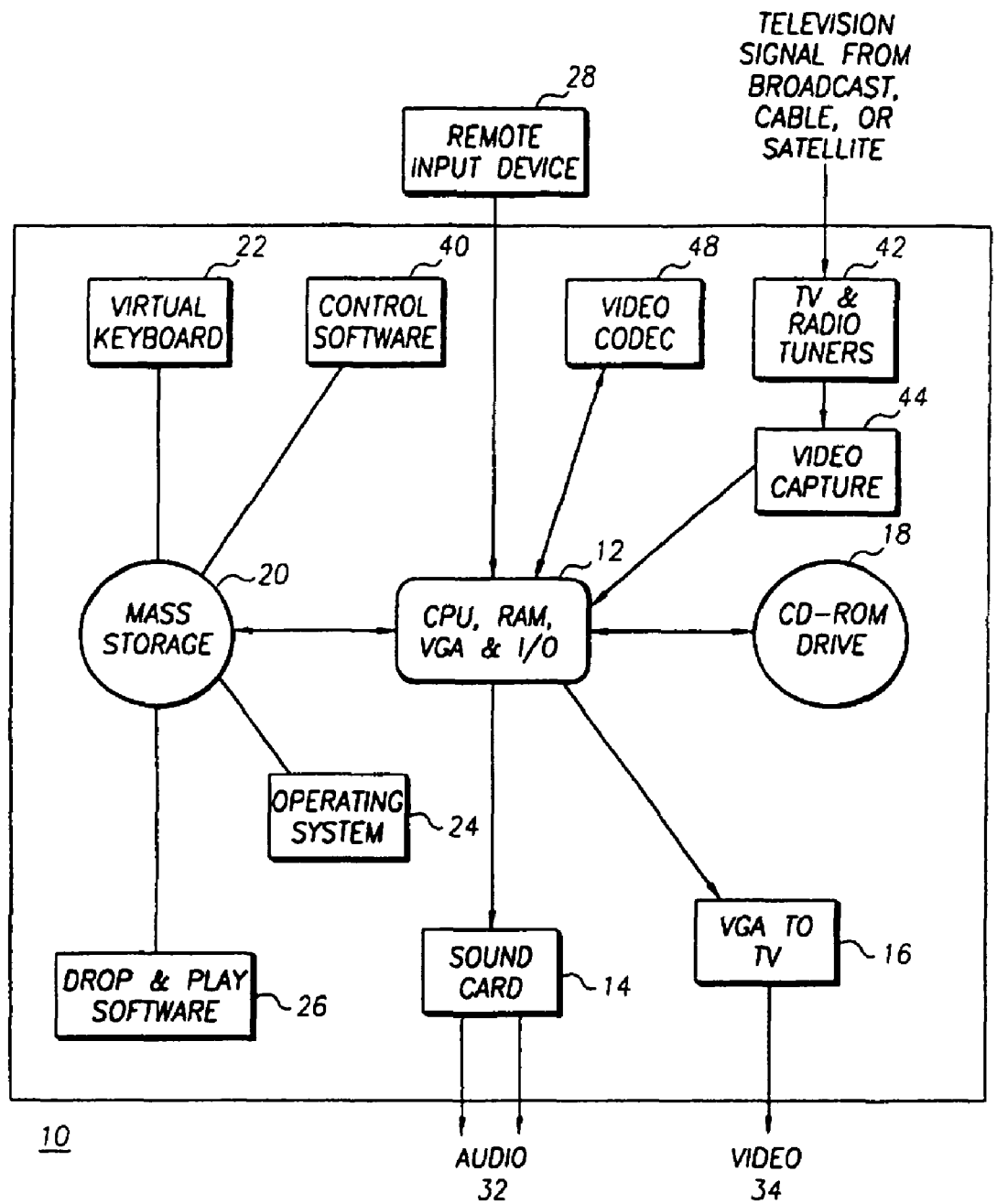
FIG. 8a illustrates a preferred embodiment of the present invention incorporating various means for providing an instant replay feature.

FIG. 8a shows another enhanced embodiment of the present invention, including video capture board 44, video compression codec 48, as well as tuner 42 for receiving television signals. With this embodiment, the current portion of a televised program is compressed using video codec 48, and cached in storage unit 20. This process proceeds continually, thus caching the last few minutes of the television program until they are gradually overwritten by more current data. Those of ordinary skill in the art will recognize that the amount of video programming that can be cached in this manner in storage unit 20 depends upon the capacity of the storage unit as well as on the degree of compression achieved by video codec 48.

With this video capture capability, the present player provides a revolutionary and advantageous feature of instant television replay on demand (as well as permanent archival storage thereafter if desired) of a short program highlight, though the user's VCR was not actively recording at the actual moment the highlight occurred. A method for implementing the instant playback feature is described further in the flow diagram of FIG. 8b. At block 100, tuner 42 receives a television signal; at block 102, the signal is presented to processor 12 by video capture board 44 in a suitable digital format.

The signal is compressed by video codec 48 at block 104, and cached in storage unit 20 (still in compressed form) at block 106. At decision point 108, if a user requests instant replay, then at block 110 the cached data is decompressed by video codec 48 and is replayed on the television at block 112, preferably in a partitioned on-screen window if the user's television supports multi-window display.

Figure 8B:
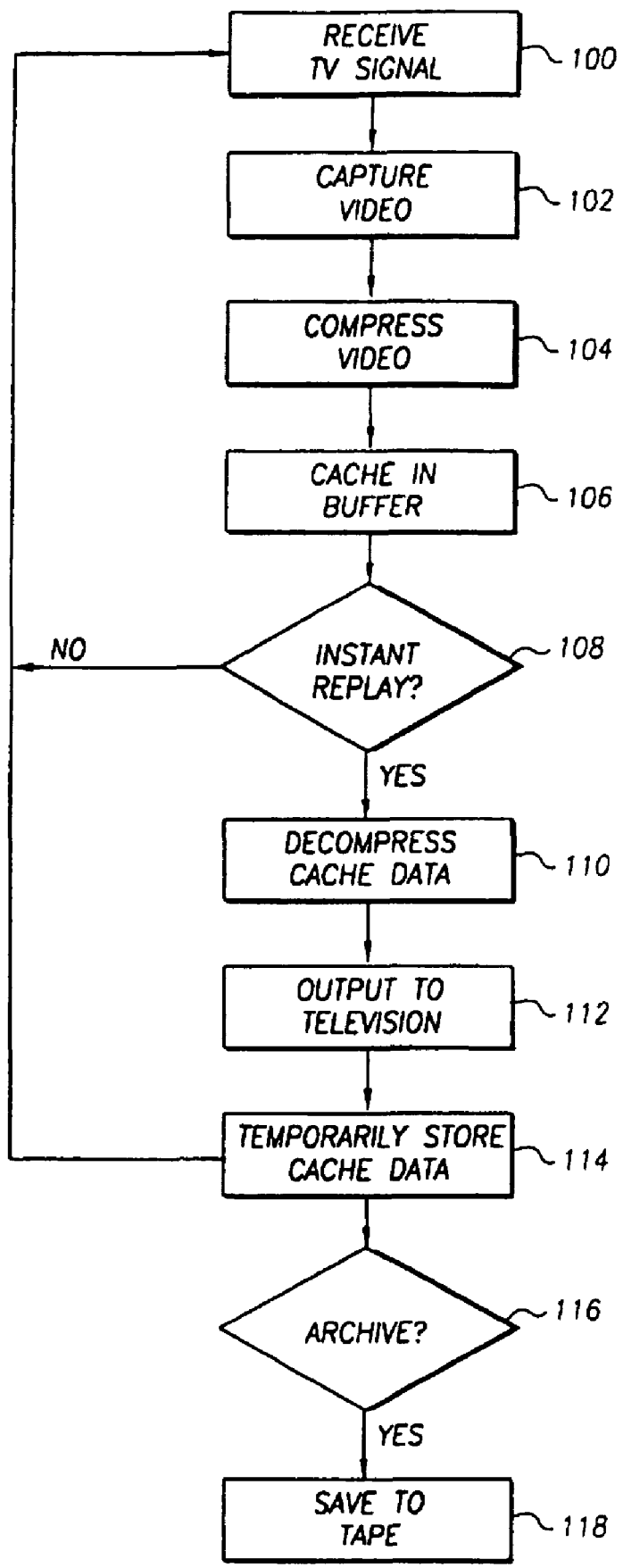
FIG. 8b illustrates procedures preferably performed in accordance with the present invention for providing an instant replay feature.

Concurrently, at block 114, the cached data is immediately stored to a protected area of storage unit 20. Preferably, at block 116, if the user requests permanent storage of the highlight, the cached data is then output to auxiliary storage unit within the home entertainment system, such as digital video tape. Meanwhile, whether or not instant replay has been requested, the process of caching the most recent programming continues without significant interruption, as depicted in FIG. 8b.

Figure 9:
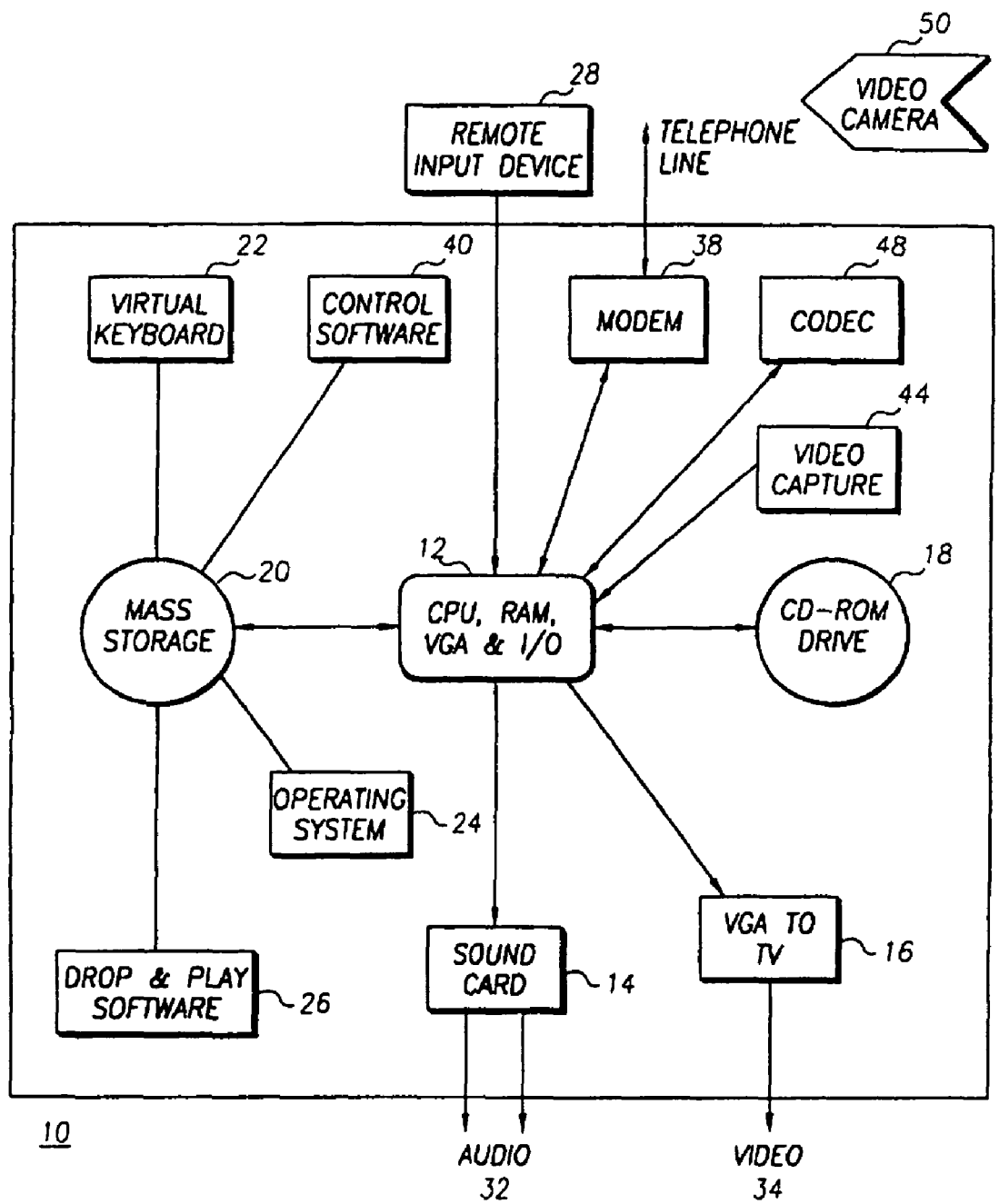
FIG. 9 illustrates a preferred embodiment of the present invention for providing video teleconferencing.

FIG. 9 illustrates a further enhanced version of the present invention including video camera 50, so that the present player can be used to provide video teleconferencing services. For example, if two users are both equipped with the system of FIG. 9, a teleconference session can be established between the users by using their respective telecommunications links 38.

Video camera 50 records input images of each user, and the images are periodically captured and compressed using video capture board 44 and video codec 48, and are transmitted across the telephone network between the respective telecommunications links 38. The images received by each user are decompressed using video codec 48, and displayed on the user's television set by the present player concurrently with the telephone call. The audio portion of the telephone call may be output by the player through the user's home audio system.

Figure 10:
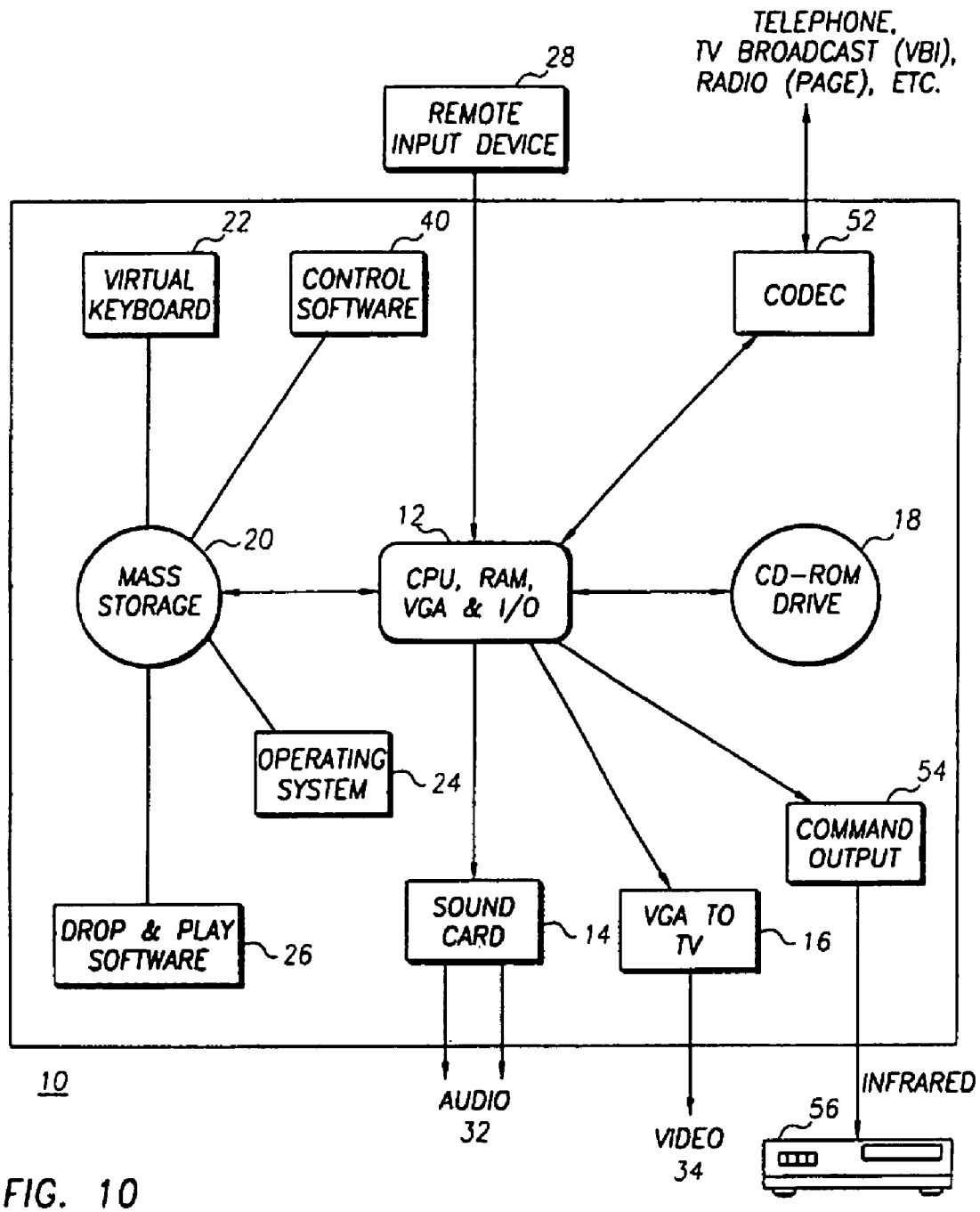
FIG. 10 illustrates a preferred embodiment of the present invention for remotely controlling other appliances within a home entertainment system.

FIG. 10 illustrate a preferred embodiment of the present invention which further includes command output device 54 for controlling other appliances within a home entertainment system. Command output device 54 preferably emits an infrared signal compatible with the remote control operation of other appliances within the home entertainment system such as VCR 56.

In this way, computer software can be executed on the player providing menu-driven, interactive, remote control of VCR 56 or other entertainment appliances. As an example, the player of FIG. 10 can advantageously control a television set and VCR if control software 40 (and associated control logic) of the player is equipped to receive broadcasts of television program guide information such as provided by the StarSight system.

In the embodiment of FIG. 10, control software 40 internally formulates appropriate commands for the desired appliance, depending on the menu-driven input provided by the user. Command output device 54 will then output these commands so as to control the appliance, e.g. the VCR will automatically be programmed for timed recording as desired by user. Thus, software can be written with the full complexity and richness supported by processor 12 and operating system software 24 (i.e., preferably the full potential of MPC-compatible software) so as to facilitate centralized, user-friendly, interactive control of any desired appliance within the user's home entertainment system.

Optionally, the title area or other non-program area of a CD-ROM or DVD may be used to store an instruction set, such as a script, which facilitates automatic installation of the CD-ROM or DVD. That is, an instruction set may be stored on the CD-ROM/DVD in an area thereof where the entry of information is optional and where the entry of information does not directly affect the post-installation operation of the software program stored on the CD-ROM/DVD. This instruction set comprises information, such as a script, which facilitates or effects, preferably with little or no user interaction, automatic installation of a software program, such as a game, stored on the CD-ROM/DVD.

Figure 11:
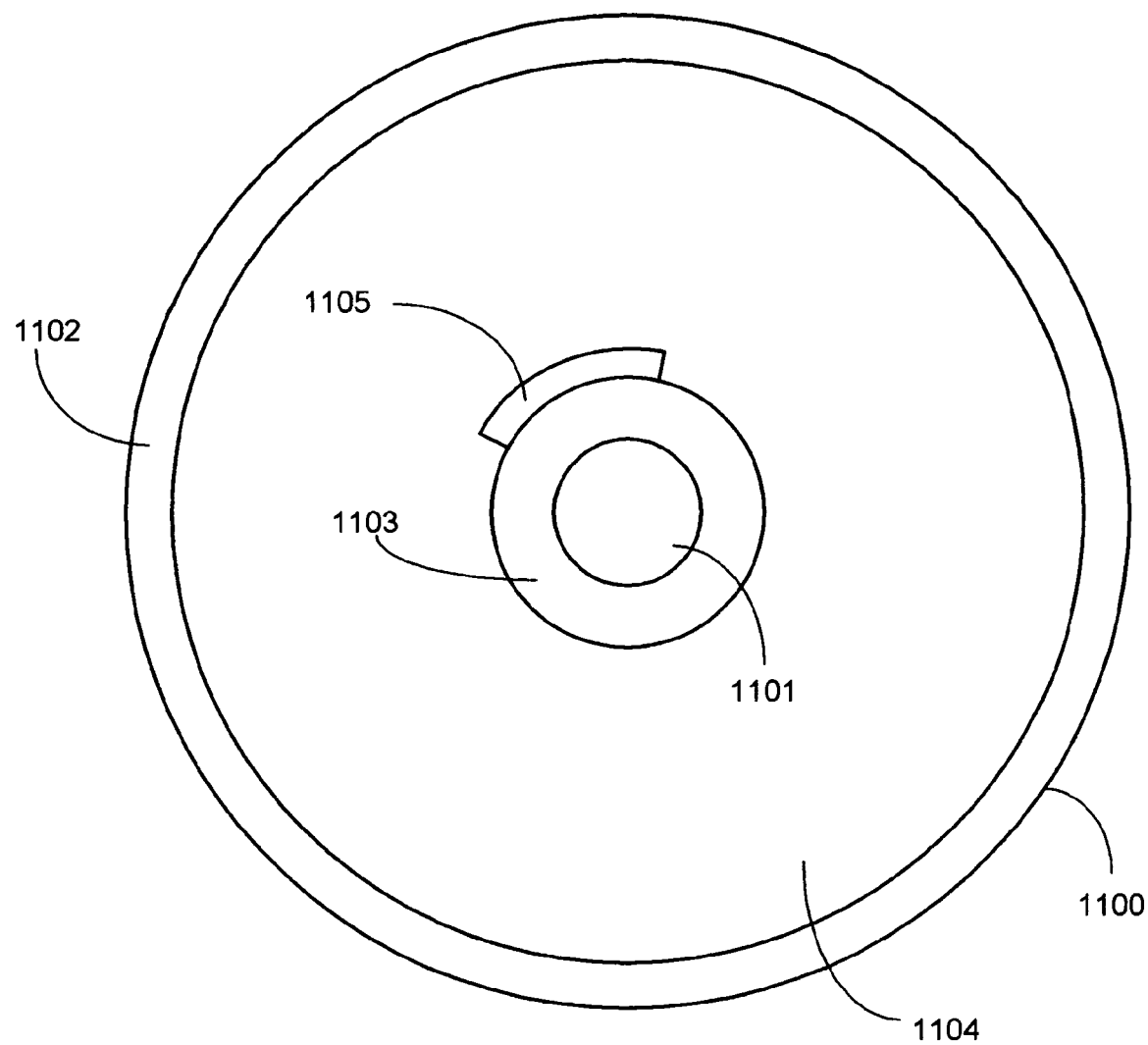
FIG. 11 illustrates a CD/DVD-ROM having a title area which is used to store an installation instruction set according to the present invention.

FIG. 11 shows a CD-ROM or a DVD 1100 having an opening 1101 at the hub thereof. The CD-ROM/DVD has unrecorded areas 1102 and 1103 at the outer periphery and proximate the hub thereof, respectively.

A software program, such as an interactive multimedia game, is stored in a data or recorded area 1104. The header information area, such as the title area 1105 is used according to contemporary practice, to optionally store a title and/or any other desired optional information (such as the time/date of recording, serial number, name of the software producer, etc).

According to the present invention, at least a portion of the header information area (such as the title area 1105), or any other area where information may optionally be stored, is used to store an instruction set, such as a script, for facilitating automatic installation of the software program stored on the CD-ROM/DVD.

Figure 12:
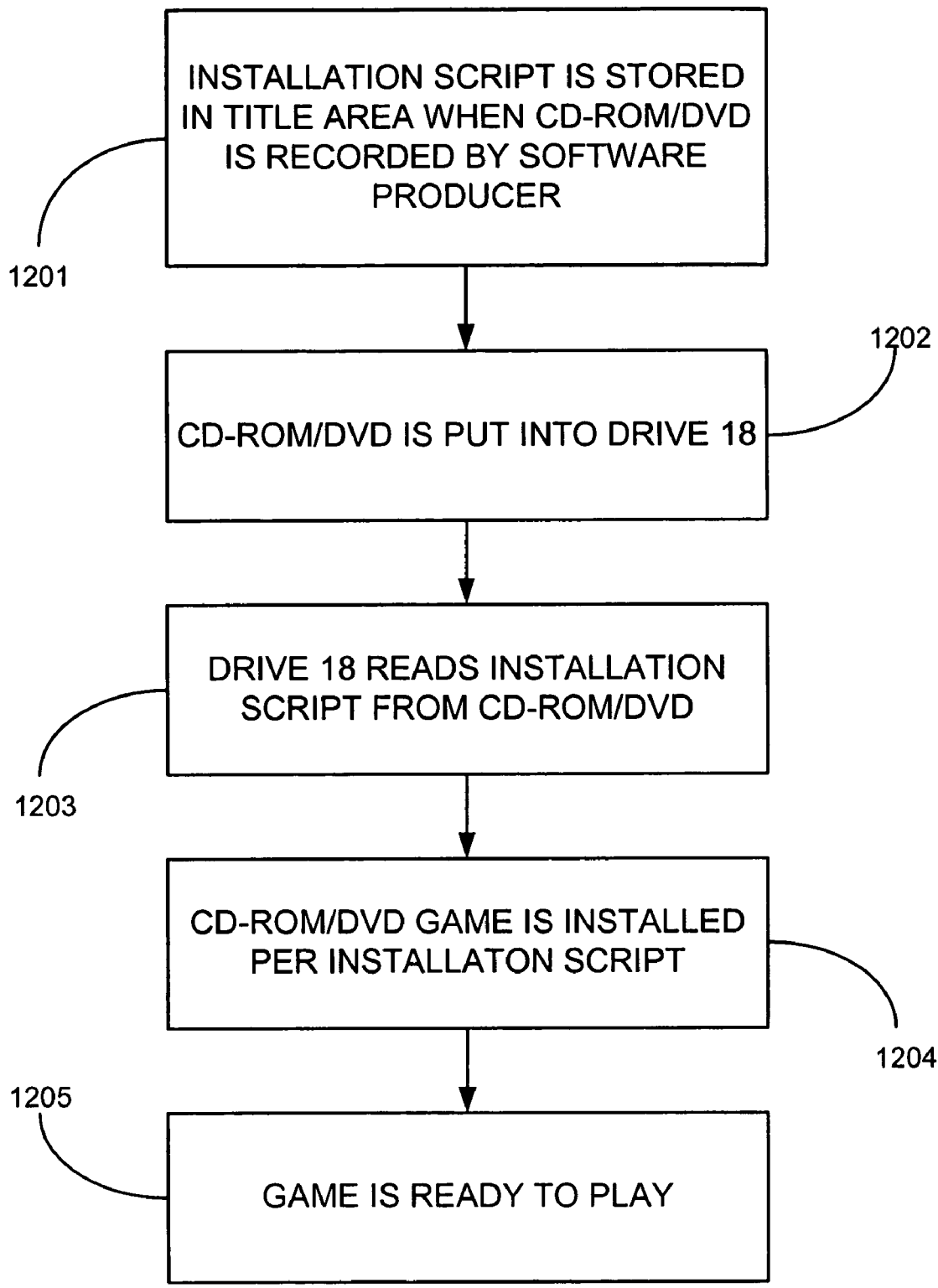
FIG. 12 is a illustrative flow chart of an exemplary procedure for using a script stored in the title area of a CD-ROM or DVD to facilitate installation of a software programs which is also stored upon the CD-ROM/DVD.

FIG. 12 shows the process for using the script for facilitating automatic installation of software. The installation script is stored in an area of the CD-ROM/DVD where recording is optional, such as in the title area 1105 of FIG. 11, as shown in block 1201. This is typically done by the software producer at the time that the remainder of the CD-ROM/DVD is recorded. However, if suitable multi-session recording media are used, the script may be recorded at a different time with respect to the software program.

A user places the CD-ROM/DVD into the drive 18 of FIGS. 1, 4-8a, 9 and 10 as shown in block 1202. The drive 18 reads the installation script from the CD-ROM/DVD as shown in block 1203.

The CD-ROM/DVD game is installed per the instructions contained within the installation script as shown in block 1204 and the game is then ready to play as shown in block 1205.

Figure 13:
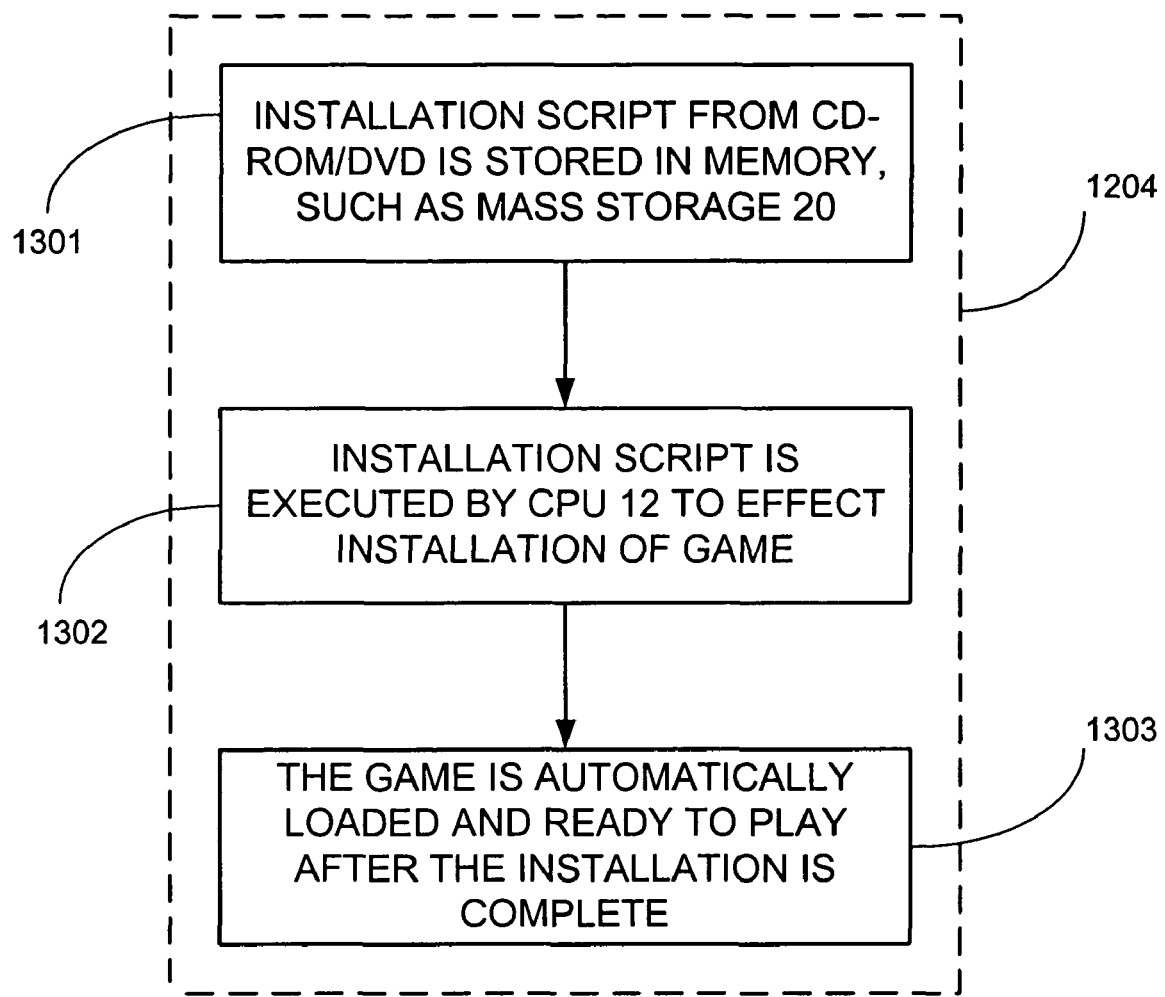
FIG. 13 is a detailed flow chart showing the procedure of installing a software program in greater detail.

FIG. 13 shows block 1204 of FIG. 12 in greater detail. As shown in FIG. 13, installing the CD-ROM/DVD game per the installation script typically comprises storing the installation script from the CD-ROM/DVD in a memory, such as the mass storage 20 of FIGS. 1, 4-8a, 9 and 10 as shown in block 1301.

The installation script is executed by the CPU 12 of FIGS. 1, 4-8a, 9 and 10 as shown in block 1302. Preferably, the game or other software program is then automatically loaded and ready to play after installation is complete, as shown in block 1303.

Thus, according to the present invention, installation of a software program, such as a game, is accomplished with little or no user interaction. In this manner, the present invention facilitates the use of PC games and the like with the ease of dedicated game consoles like the as Nintindo's Game Cube, Microsoft's XBox and Sony's Play Station. Thus, users can have the wide variety of software available for the PC with the convenience associated with the use of such contemporary game consoles.

According to one aspect, the present invention comprises a method for installing a software program, wherein the method comprises defining a known computer system for executing the software, the known computer system at least partially defining a known installation procedure for the known computer system and providing a script defined at least in part by the known installation procedure.

As those skilled in the art will appreciate, a known computer system has known computer components, such as the capacity of the random access memory, the capacity of the hard drive, the speed of the CPU and the type of video display. Therefore, with a known computer system a known installation procedure is implied which takes into account the known computer components. A script can thus be defined for this known installation procedure.

According to one aspect, the present invention comprises a method for installing a software program, wherein the method comprises providing a database that contains installation information, updating the database via at least one of a network and portable media, and using the installation information to perform an installation of the software program.

Preferably, the database contains at least on installation script. Preferably, the database contains a plurality of installation scripts for a plurality of software programs.

Thus, installation information may come from the database, a network, a portable media, or any combination of these sources. One source may be used to update another source, as desired.

According to one aspect, the present invention comprises a method for installing a software program, wherein the method comprises using a script to at least partially install the software program without identifying the software program. The program need not be identified since the installation script provides sufficient information to facilitate installation without have to refer to another source, such as the database.

When the software program is provided via a network, then the installation information, such as that which can be stored in the header information area of a CD-ROM/DVD as described above, can be provided in a header of the data transmission and then used in a manner similar to the information stored in the header information area.

Although the recordable media upon which a software program such as an interactive multimedia game is described herein as being CD-ROM or a DVD, those skilled in the art will appreciate that various other recordable media are likewise suitable. For example, the recordable media may alternatively be a floppy disk, a hard disk, tape, an electro-optical media, a memory stick, a USB drive, or any other desired type of media. Thus, discussion of the recordable media herein as a CD-ROM/DVD is by way of example only, and not by way of limitation.

Other embodiments and modifications within the spirit of the present invention will occur to those of ordinary skill in the art in view of these teachings, including but not limited to using additional or alternative system components; providing support for additional or alternative computer entertainment functions; and providing compatibility with additional or alternative platforms. Such embodiments remain within the scope of the present invention, to the extent they fall within the scope of the following claims.

I claim:

1. A multimedia apparatus configured for use in a home entertainment system, said apparatus comprising:
   a data communications link configured to receive a software program via a network wherein the software programs are formatted and published for compatibility with standard computer platforms;
   a processing device configured to identify the software program received by the data communications link and to determine whether said software program needs to be installed or has already been installed, and if it needs to be installed, to determine whether installation information relating to the software program is available to the processing device, said processing device further being configured to begin playing the software program if it has already been installed or to automatically initialize an installation of the software program prior to playing the software program if the installation information is available whereby the processing device is capable of initiating the software program without alteration or additional configuration of the software program;
   circuits for generating an output signal in response to the multimedia software program whereby said circuits are configured to read an instruction set wherein the instruction set comprises an installation script wherein the circuit is further configured to read an instruction set stored in a header area of a CD-ROM/DVD, the instruction set facilitating automatic installation of the software program; and
   an output means for providing audio and image data resulting from playing the software program to the home system.

2. The multimedia apparatus as in claim 1, wherein the network comprises the Internet.

3. The multimedia apparatus as in claim 1, further comprising a database containing installation information relating to software programs identifiable for playing by the multimedia apparatus, wherein the processing device is configured to determine whether installation information relating to the software program being read by the reading means is available to the processing device by looking up the database.

4. The multimedia apparatus as in claim 3, wherein the database includes an installation status table containing installation information for particular software programs identifiable by the multimedia apparatus.

5. The multimedia apparatus as in claim 1, wherein the processing device is configured to identify said software program by deriving a unique identifier from unique elements intrinsic to said software program.

6. The multimedia apparatus as in claim 5, wherein the processing device is further configured to match said unique identifier to the installation information in the database.

7. The multimedia apparatus as in claim 5, wherein the processing device is further configured to derive said unique identifier by computing a hash function derived from a file allocation table of the portable recording medium.

8. The multimedia apparatus as in claim 1, wherein the processing device is configured to be backward compatible to play those software programs that are formatted to be executed on at least one personal computer platform without requiring prior modification to such software programs.

9. The multimedia apparatus as in claim 8, wherein the processing device is compatible with an operating system selected from the group consisting of DOS, Linux, Mac OS, and Windows.

10. The multimedia apparatus as in claim 1, wherein the processing device is configured to identify the software program independent of external networks.

11. The multimedia apparatus as in claim 1, wherein the output means is configured to provide the image data in a format compatible for display by a television monitor in the home entertainment system.

12. The multimedia apparatus as in claim 1, wherein the processing device is configured to perform personal computer tasks and the output means is configured to provide the image data in a format that does not require a computer monitor.

13. The multimedia apparatus as in claim 1, wherein the software program comprises a game.

14. The multimedia apparatus as in claim 1, wherein the instruction set comprises a script.

15. A home entertainment system comprising:
    an input for receiving user commands;
    a display for presentation of image data;
    an audio circuit for presentation of audio data;
    one or more audio or video components for playing audio or video recordings; and
    a multimedia apparatus having capability of playing software programs, comprising:
    a data communications link configured to receive a software program via a network wherein the software programs are formatted and published for compatibility with standard computer platforms;
    a processing device configured to identify the software program received by the data communications link and to determine whether said software program needs to be installed or has already been installed, and if it needs to be installed, to determine whether installation information relating to the software program is available to the processing device, said processing device further being configured to begin playing the software program if it has already been installed or to automatically initialize an installation of the software program prior to playing the software program if the installation information is available whereby the processing device is capable of initiating the software program without alteration or additional configuration of the software program
    circuits for generating an output signal in response to the multimedia software program whereby said circuits are configured to read an instruction set wherein the instruction set comprises an installation script wherein the circuit is further configured to read an instruction set stored in a header area of a CD-ROM/DVD, the instruction set facilitating automatic installation of the software program; and
    an output means for providing audio and image data resulting from the playing of the software program to the audio means and the display means.

16. The home entertainment system as in claim 15, wherein network comprises the Internet.

17. The home entertainment system as in claim 15, further comprising a database containing installation information relating to particular software programs identifiable for playing by the multimedia apparatus, wherein the processing device is configured to determine whether installation information relating to the software program being read by the reading means is available to the processing device by looking up the database.

18. The home entertainment system as in claim 17, wherein the database includes an installation status table containing installation information for particular software programs identifiable by the multimedia apparatus.

19. The home entertainment system as in claim 15, wherein the processing device is configured to identify said software program by deriving a unique identifier from unique elements intrinsic to said software program.

20. The home entertainment system as in claim 19, wherein the processing device is further configured to match said unique identifier to the installation information in the database.

21. The home entertainment system as in claim 19, wherein the processing device is further configured to derive said unique identifier by computing a hash function derived from a file allocation table of the portable recording medium.

22. The home entertainment system as in claim 19, wherein the processing device is configured to be backward compatible to play those software programs that are formatted to be executed on at least one personal computer platform without requiring prior modification to such software programs.

23. The home entertainment system as in claim 22, wherein the processing device is compatible with an operating system selected from the group consisting of DOS, Linux, Mac OS, or Windows.

24. The home entertainment system as in claim 15, wherein the processing device operates independent of external networks.

25. The home entertainment system as in claim 15, wherein the output means is configured to provide the image data in a format compatible for display by a television monitor in the home entertainment system.

26. The home entertainment system as in claim 15, wherein the processing device is configured to perform personal computer tasks and the output means is configured to provide the image data in a format that does not require a computer monitor.

27. The multimedia apparatus as in claim 15, wherein the software program comprises a game.

28. The multimedia apparatus as in claim 15, wherein the instruction set comprises a script.

29. The multimedia apparatus as in claim 15, wherein the instruction set comprises an installation script.

30. A method of executing a software program in a home entertainment system, said method comprising:
    providing a data communications link configured to receive software program from a network whereby the communications link provides access to interactive television services, video conferencing and instant replay of television transmission, interactive multimedia software programs and other multimedia medium;
    reading an instruction set stored in a header area of a CD-ROM/DVD, the instruction set facilitating automatic installation of the software program;

identifying the software program being read by the reading means;

determining whether the software program needs to be installed or has already been installed, and should it need to be installed, whether installation information relating to the software program being read by the reading means is available to be used to perform an automatic installation of the software program;

beginning the playing of the software program if it has already been installed or automatically initializing an installation of the software program prior to executing the software program if the installation is available providing a lookup table or database used to automate the installation process in the form of a mass storage medium; and providing audio and image data resulting from the playing of the software program to the home entertainment system.

31. The method as in claim 30, wherein the network comprises the Internet.

32. The method as in claim 30, wherein the act of determining comprises the acts of:

storing in a database installation information relating to particular software programs identifiable for playing; and looking up the database to determine whether installation information relating to the software program is contained in the database.

33. The method as in claim 32, wherein the database includes an installation status table containing installation information for particular software programs.

34. The method as in claim 30, wherein the identifying act comprises the act of deriving a unique identifier from unique elements intrinsic to said software program.

35. The method as in claim 34, wherein the software program is identified by matching said unique identifier to the installation information in the database.

36. The method as in claim 34, wherein the unique identifier of the software program is derived by computing a hash function derived from a file allocation table of the portable recording medium.

37. The method as in claim 30, wherein the playing act is performed by a processing device which is configured and structured to be backward compatible to play those software programs that are formatted to be executed on at least one personal computer platform without requiring prior modification to such software programs.

38. The method as in claim 37, wherein the processing device is compatible with an operating system selected from the group consisting of DOS, Linux, Mac OS, or Windows.

39. The method as in claim 38, wherein the determination act is independent of external networks.

40. The method as in claim 38, wherein the image data provided is configured in a format compatible for display by a television monitor in the home entertainment system.

41. The method as in claim 38, further comprises the act of configuring to perform personal computer tasks and the image data is provided in a format that does not require a computer monitor.

* * * * *